United States Patent [19]

Kurei

[11] 4,360,257
[45] Nov. 23, 1982

[54] RESETTING APPARATUS FOR SINGLE LENS REFLEX PHOTOGRAPHIC CAMERA

[75] Inventor: Hiroshi Kurei, Kawagoe, Japan

[73] Assignee: Asahi Kogaku Kogyo Kabushiki Kaisha, Tokyo, Japan

[21] Appl. No.: 258,044

[22] Filed: Apr. 28, 1981

[30] Foreign Application Priority Data

Apr. 30, 1980 [JP] Japan .............................. 55-59667[U]

[51] Int. Cl.$^3$ ......................... G03B 7/00; G03B 19/12
[52] U.S. Cl. ....................................... 354/36; 354/40; 354/152; 354/271; 354/228
[58] Field of Search ....................... 354/36, 38, 43, 44, 354/152, 234, 235, 266, 271, 40, 228, 229

[56] References Cited

U.S. PATENT DOCUMENTS 4,142,787 3/1979 Ueda et al. ............................ 354/38

Primary Examiner—William B. Perkey
Attorney, Agent, or Firm—Christie, Parker & Hale

[57] ABSTRACT

In a single lens reflex photographic camera including a shutter release and a diaphragm, a mirror is movable between a first position for view finding and a second position for film exposure. The mirror is placed in the second position and the diaphragm is stopped down responsive to the shutter release. Prior to exposure, the diaphragm stop down mechanism is locked. After exposure, a shutter completion mechanism is actuated. Responsive to the actuation of the shutter completion mechanism, the diaphragm stop down mechanism is unlocked and the mirror is placed in the first position. A reduction in complexity results because both resetting operations are executed responsive to the same element, namely the shutter completion mechanism. An actuating pin operates twice during each camera cycle—once at the time of resetting the mirror and once at the time of shutter charging. A control magnet has an armature and a core. The diaphragm is locked responsive to the repulsion of the armature from the core and unlocked responsive to the attraction of the armature against the core. The armature is driven against the core responsive to the operation of the actuating pin, thereby unlocking the diaphragm stop down mechanism and insuring that the armature is not separated from the core prior to a subsequent shutter release.

5 Claims, 8 Drawing Figures

RESETTING APPARATUS FOR SINGLE LENS REFLEX PHOTOGRAPHIC CAMERA

BACKGROUND OF THE INVENTION

This invention relates to a single lens reflex photographic camera of the automatic diaphragm control type and, more particularly, to apparatus for resetting such a camera after exposure.

In a photographic camera of automatic diaphragm control type in shutter speed priority mode, the exposure time is preset to a value at the operator's will and then automatic exposure control is effected by driving the diaphragm control mechanism so as to stop the diaphragm down to a value for the proper exposure based on said preset value of exposure time. Afterwards, it is required to reset the diaphragm to the initial position, upon completion of this operation.

In a photographic camera as the single lens reflex camera having its objective diaphragm usually maintained fully opened except during actual photographing so that the desired focussing with a shallow depth of focus can always be readily made through a bright field of view, the initial position to which the diaphragm should be reset corresponds to the fully open diaphragm of the individual objective mounted on the camera.

Further, in a photographic camera of automatic exposure control type which is, as previously mentioned, adapted to provide the proper exposure by stopping down operation of the objective diaphragm based on the preset value of the exposure time, i.e., in the mode of so-called shutter speed adjustment priority, the stopping down operation for the proper exposure must have already been accomplished immediately before the shutter operates, the diaphragm value regulated as a result of such stopping down must be maintained during the exposure effected by said shutter operation, and the reset of the diaphragm to its initial position after completion of photographing must be done after completion of the shutter operation. In order that such a fundamental sequence of operations may be correctly done in the single lens reflex camera, not only is it necessary to incorporate up-and-down movement of the mirror which is peculiar to the single lens reflex camera into said sequential operation, but also it is required, especially for a camera provided with a focal plane shutter, which is used for lens interchangeability, that the diaphragm should have been stopped down to the value corresponding to the proper exposure at least before the leading shutter curtain starts and that the signal generated at the end of the trailing curtain's travel releases the diaphragm stop down mechanism so that the diaphragm, being biased to return to its initial position, can be actually reset to said initial position.

The present invention makes the operation to reset the diaphragm control mechanism more reliable and thereby meets the above-mentioned requirements.

SUMMARY OF THE INVENTION

In a single lens reflex photographic camera including a shutter release and a diaphragm, a mirror is movable between a first position for view finding and a second position for film exposure. The mirror is placed in the second position and the diaphragm is stopped down responsive to the shutter release. Prior to exposure, the diaphragm stop down mechanism is locked. After exposure, a shutter completion mechanism is actuated. Responsive to the actuation of the shutter completion mechanism, the diaphragm stop down mechanism is unlocked and the mirror is placed in the first position. A reduction in complexity results because both resetting operations are executed responsive to the same element, namely the shutter completion mechanism.

A feature of the invention is an actuating pin that operates twice during each camera cycle—once at the time of resetting the mirror and once at the time of shutter charging. A control magnet has an armature and a core. The diaphragm is locked responsive to the repulsion of the armature from the core and unlocked responsive to the attraction of the armature against the core. The armature is driven against the core responsive to the operation of the actuating pin, thereby unlocking the diaphragm stop down mechanism and insuring that the armature is not separated from the core prior to a subsequent shutter release.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENTS

Figure 1:
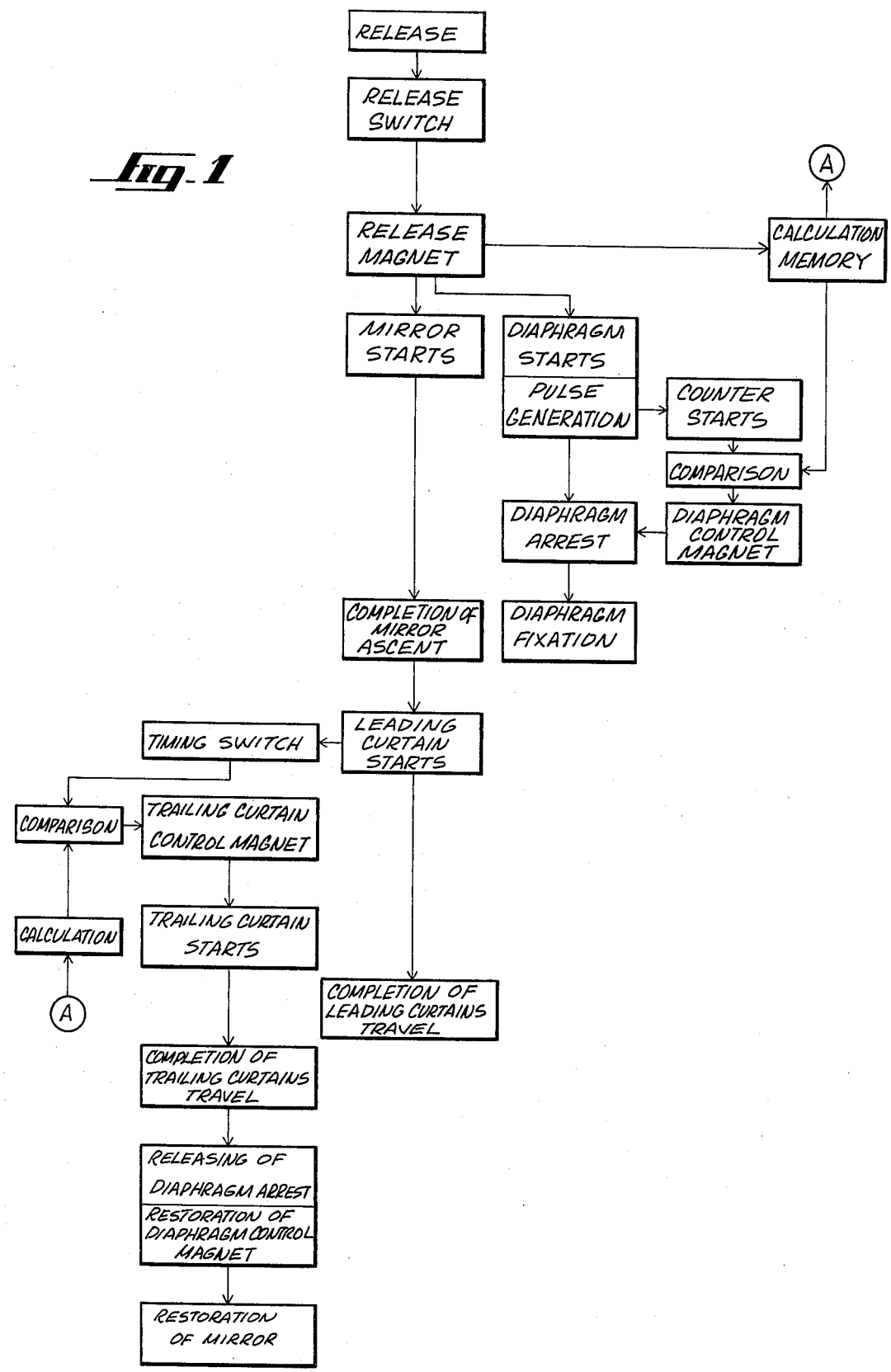
FIG. 1 is a schematic block diagram of the operating sequence of a photographic camera of automatic diaphragm control type.

The manner in which the respective parts of a photographic camera provided with the electromagnet and the mechanism operatively associated therewith to maintain the diaphragm stop down operation will be described with reference to a time sequence diagram shown by FIG. 1. The release switch is closed upon shutter release and thereby the release magnet is energized to bring the diaphragm control members, which have been locked at their full diaphragm positions, into their states ready for operation of diaphragm regulation or lens stopping down. At the same time, the arithmetic operation for calculation of the proper exposure (the proper diaphragm value in this case) is initiated on the basis of the preset shutter speed, the sensitivity of film in use, and the photometric value stored in the associated memory. Reference is made to Application Ser. No. 235,839, filed on Feb. 19, 1981, for a description of an embodiment of an automatic diaphragm control system for carrying out a stop down operation; the disclosure of this application is incorporated fully herein by reference. Further depression of the release rod causes the mirror to swing up. Simultaneously, the operation of diaphragm regulation starts and also counting of electric pulses generated as said operation of diaphragm regulation goes on, starts. The pulses added up as said regulation progresses are introduced also to the comparator to which the output corresponding to the result of said arithmetic operation is introduced, and upon coincidence of both the diaphragm control magnet is energized so that a locking tooth mounted on an armature now held by this excited magnet under attractive force thereof locks the member operatively associated with operation of diaphragm regulation or lens stopping down, preventing this member from further operation and keeping the value to which the diaphragm has been stopped down stable. When the mirror completes its swinging up movement, the leading shutter curtain starts and a timing switch adapted to be closed upon starting of said leading shutter curtain applies the signals in accordance with the preset exposure time to a comparator to control the point in time at which the trailing shutter curtain control magnet holding the trailing curtain against its travel should be de-energized. When the preset exposure time is reached, the trailing shutter curtain control magnet is de-energized, permitting the following shutter curtain to start its travel, and upon termination of this travel a signal is generated, with which the members which have locked the diaphragm in a regulated state are released. Upon such release, the locking effect which has been exerted on the mirror to prevent its descent is also released so that the mirror can now return to its initial position.

As an actual mechanism operating in accordance with such time sequence, an arrangement has often been employed such that suitable reduction gearing is coupled to a member which is, in turn, operatively associated with the operation of diaphragm regulation or lens stopping down for automatic control of the diaphragm; a locking tooth is engageably opposed to a gear mounted on a part of said reduction gearing; said locking tooth is provided with an armature adapted to be attractively held by a core of a diaphragm control magnet to keep said locking tooth disengaged from said gear; the diaphragm control magnet is energized when the aperture has been stopped down to a controlled value to bring said locking tooth into engagement with said gearing so as to arrest the operation of the aperture regulation or lens stop down. When the diaphragm, which has been actuated, is arrested by such sequential operation, it is required to release said gearing form the locking action of said locking tooth after completion of photographing and before resetting the diaphragm to its initial fully opened position. In the usual mirror actuating mechanism, the return of the mirror to its initial lower position and the reset of the diaphragm to its initial fully opened position occur simultaneously, so that the disengagement of the locking tooth from said gearing must be carried out with the signal generated at the end of the travel of the trailing shutter curtain, before the mirror returns to its initial lower position. (Such requirement is based on the assumption that a lever used to regulate or stop the diaphragm down corresponds to a control lever by which the diaphragm value is directly governed and movement of such lever is directly related to operation of lens stop down.)

Said locking effect releasing signal generated at the end of the travel of the trailing shutter curtain causes the lever acting upon the locking tooth to be attractively held by the diaphragm control magnet so that the diaphragm is reliably maintained free from any locking action. However, any accidental shock externally exerted on the camera might result in an undesirable situation; for example, the armature might be separated from the core so diaphragm control is no more possible at all.

Apart from the exceptional case where the armature is separated from the magnet core after the shutter charging, said accident often occurs when the camera remains unused for a long period of time. To overcome such problem, the present invention provides a novel arrangement assuring that the diaphragm control mechanism is reliably actuated so that, even when accidental separation of the armature from the magnet core takes place during nonuse of the camera for a long period before the shutter is newly charged, the armature is reliably attracted and held again by the magnet core, every time the shutter is charged for another photograph.

An example of specific arrangements devised according to the present invention will be apparent from reading the following description with reference to an embodiment as shown by the accompanying drawings.

Figure 2:
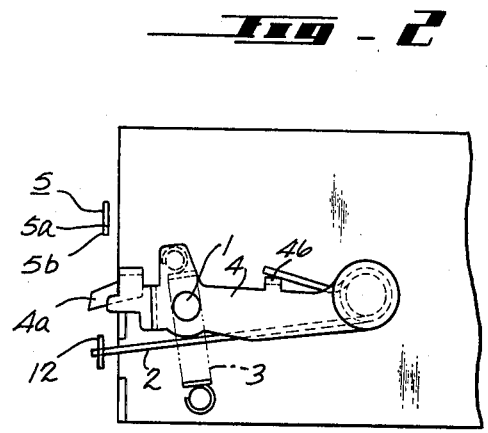
FIGS. 2 and 3 are schematic bottom views of a mirror box showing some of the parts of apparatus incorporating the principles of the invention at different stages of the sequence of operation.
Figure 3:
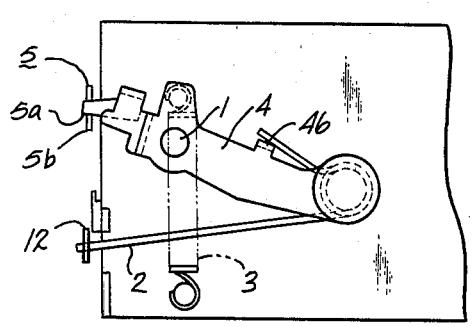
Figure 4:
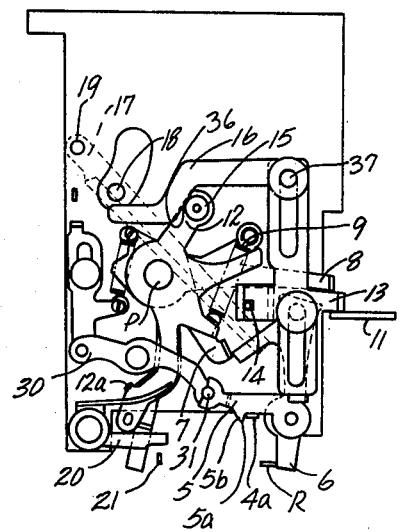
FIGS. 4 and 5 are schematic side views of the mirror box of FIGS. 2 and 3 at different stages of the sequence of operation.
Figure 5:
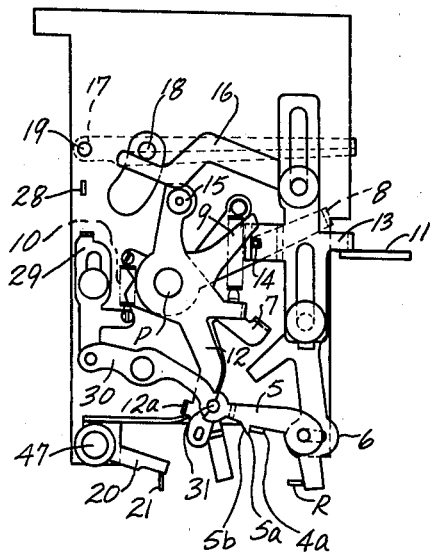

FIGS. 2 and 3 are bottom views of a mirror box showing a charging mechanism of well-known arrangement serving to actuate the mirror in the single lens reflex camera. FIG. 2 shows the mirror charging mechanism operatively associated with the shutter charging mechanism in its position prior to shutter charging. FIG. 3 shows the mirror charging mechanism in its position after shutter charging. FIG. 4 is a side view of the mirror box showing it after shutter charging and FIG. 5 is a similar view but showing the mirror box as in its state where the mirror has swung up so that operation of stopping down and exposure have already taken place.

Now a structural section of said mirror actuating mechanism, into which the mechanism according to the present invention is incorporated, will be described in detail. Reference numeral 1 designates a pin adapted to be depressed by a mirror charging lever (not shown) which is, in turn, operatively associated with the shutter charging. Pin 1 is fixed on a first actuating lever 4, which is pivotally mounted on the bottom of the mirror box so that said lever 4 can swing around said pivot. Reference numeral 2 designates a spring wound around the pivot for the first actuating lever 4 with one end bearing against a raised portion 46 of the first actuating lever 4 and with the other end being fixed to a portion of a mirror actuating lever 12 to urge the mirror upward. Reference numeral 3 designates a mirror restoring spring suspended between a portion of the mirror box bottom and the first actuating lever 4. When the pin 1 fixed on the first actuating lever 4 is depressed by the mirror charging lever, said first actuating lever 4 is rotated clockwise from the position of FIG. 2 to the position of FIG. 3 at which said first actuating lever 4 is subjected not only to a high charging resiliency of the spring 2 but also to a restoring force of the mirror restoring spring 3 which is now extended.

As described below in connection with FIGS. 4 and 5, a lever 5 is pivotally supported in a plane perpendicular to said lever 4 or in one of the sides of the mirror box. As the first actuating lever 4 is rotated clockwise, a forward end 4a of said lever 4 urges a slanted edge 5b of lever 5 upwardly. As said slant edge 5b is urged upwardly, said forward end engages a locking hook 5a formed in said lever 5 continguous to said slanted edge 5b so that the first actuating lever 4 is locked in its charged position so the mirror cannot descend.

The foregoing description concerning said bottom of the mirror box will be followed by a description of a mechanism at the side of the mirror box. Reference numeral 6 designates a locking lever pivotally supported in a portion of the side wall and having a fork-like configuration of which one end bears against a release plate R operatively associated with the operation of shutter release and the other end is opposed to a bent portion of a lower end of a second actuating lever 7 pivotally supported around a common pivot P mounted on the side wall so that counterclockwise rotation of said lever 6 releases the second actuating lever 7 from a locking effect of said lever 6 and thereby allows said second actuating lever 7 to be rotated counterclockwise. Lever 6 is biased to the left as viewed in FIGS. 4 and 5 by a weak spring (not shown). This spring urges the angled arm of lever 6 into engagement with the bent portion of lever 7 when the parts are positioned as shown in FIG. 4. Around said common pivot P, there are mounted said second actuating lever 7, said mirror actuating lever 12, and a separate restoring lever 8 so that the mirror actuating lever 12 follows the movement of the second actuating lever 7 and operates under control of said movement of said second actuating lever 7. Reference numeral 9 designates a spring suspended between the restoring lever 8 and the second actuating lever 7. Reference numeral 10 designates a spring for instantaneous retraction suspended between the restoring lever 8 and a release driving lever 29, which will be described later in detail. Reference numeral 11 designates a lever to stop down the lens which is moved upwards to effect the operation of stopping down. A slide plate 13, which is vertical-slidably supported, is urged upwards by lever 11. The slide plate 13 has a pin 14 fixed on a portion thereof. This pin 14 is operatively associated with the mechanism for control of the stopping down operation according to the present invention which will be described later in detail.

A mirror sheet 17 is pivotally supported by a pivot 19 and is urged by a weak spring (not shown) in a clockwise direction into its lowered position, i.e., the position shown in FIG. 4. Spring 10 is stiffer than the spring biasing mirror sheet 17 so that the former can overcome the latter when the mirror sheet is lifted. Swinging up of the mirror is effected when a pin 18 laterally projecting from the mirror sheet 17 is urged upwards by a mirror lifting lever 16. Lever 16 is, in turn, urged upwards by a pin 15 attached to the upper end of the mirror actuating lever 12 as the latter is rotated counterclockwise. To this end, said mirror lifting lever 16 includes a slant edge 36 formed on a portion thereof with which said pin 15 of the mirror actuating lever 12 is in contact, and is pivotally supported at its forward end 37 so that said mirror lifting lever 16 is capable of restorably swinging upwards.

Reference numeral 20 designates a leading shutter curtain release lever pivotally supported at its rear end 47 in the side wall and formed as a bifurcate lever facing forwards. Its upper arm engages a raised portion 12a formed on a lower portion of the mirror actuating lever 12 so that, when the mirror actuating lever 12 is rotated counterclockwise into a terminal range in which the mirror sheet 17 is sufficiently urged upwards by the pin 15 on the upper end of said mirror actuating lever 12 through the up swing of the mirror lifting lever 16 to complete the mirror lifting, the lower arm depresses a shutter locking lever 21 and thereby rotates said shutter locking lever 21 downwards sufficiently for the leading shutter curtain to start its travel.

Particularly referrring to FIGS. 4 and 5, reference numeral 28 designates a shutter completion mechanism in the form of a release lever adapted to be moved downwards when applied with a signal generated at the end of the trailing shutter curtain's travel and upon said downward movement of the release lever, the release driving lever 29 slides downwards, i.e., clockwise, to upwardly rotate the mirror descent locking lever 5 through a centrally pivotal intermediate lever 30 link-connected to said release driving lever 29 at the lower end of the latter. Spring 10 urges lever 29 upwardly, thereby biasing lever 30 in a clockwise direction and lever 5 downwardly toward lever 4, as viewed in FIG. 4. The first actuating lever 4, which has been locked by the locking hook 5a, is thereby released to restore its initial position.

Figure 6:
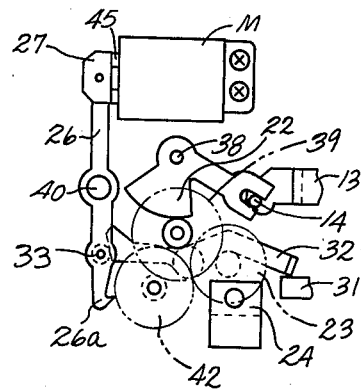
FIG. 6 is a schematic diagram of apparatus for stopping down a diaphragm in a photographic camera.
Figures 7, 8:
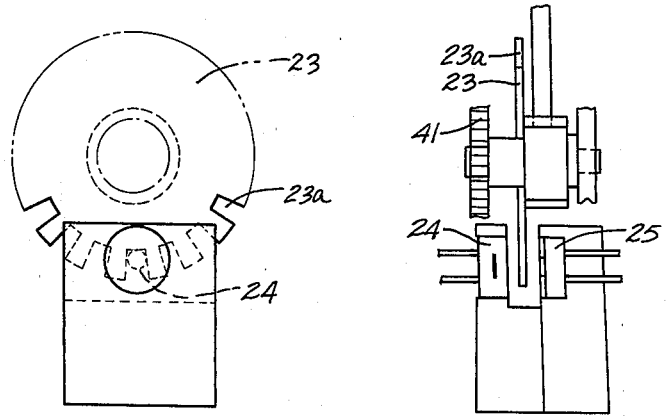
FIGS. 7 and 8 are schematic front and side views, respectively, of a photointerrupter for generating pulses, the number of which represents the extent of diaphragm stop down.

FIGS. 6 through 8 show the diaphragm control mechanism according to the present invention. FIG. 6 shows the mechanism in relation to the slide plate 13 and the pin 14 fixed thereon shown in FIGS. 4 and 5. FIGS. 7 and 8 show the basic parts of a diaphragm control pulse generator.

The pin 14 fixed on the slide plate 13 engages a bifurcated portion formed on one end of a lever of an integral lever/sector gear 22. Lever/sector gear 22 is pivotally supported at 38 so that vertical movement of the pin 14 rotates the sector gear of said integrated lever/sector gear 22 and a transmission gear 39 which, in turn, rotates a gear 42 and an interlocking gear 41 including a code disc 23. The code disc 23 has a plurality of radial slits 23a. Across a plane defined by rotation of said disc 23, there are arranged a light emitting diode (LED) 24 and a corresponding light receiving element 25 in opposition to each other. Said light receiving element 25 may be a photodiode, for example. Reference numeral 26 designates a locking lever having at its lower end a locking tooth 26a adapted to engage and disengage from said gear 42. At its upper end locking lever 26 has an armature 27. The middle of locking lever 26 is pivotally supported at 40. Below point 40, a pin 33 projects from lever 26. Reference symbol M designates a magnet for attractively holding the armature 27 by its core 45 and thereby achieving the desired diaphragm control. Magnet M comprises a weak permanent magnet that holds armature 27 against its core when the magnet coil is not energized. When the magnet coil is energized, magnet M repels armature 27 away from its core. Reference numeral 32 designates a reset lever pivotally supported at its middle so that its forward end is urged upwards by a pin 31, which is fixed to said intermediate lever 30. As a result, the rear end of lever 32 bears on said pin 33 to urge lever 26 clockwise, thereby releasing the gear 42 from the locking effect of the locking tooth 26a.

With the mechanism thus arranged according to the present invention, movement of the release plate R to the right as seen in FIG. 5 from the state shown by FIGS. 3 and 4, in which the operation of shutter charging has been completed, causes the locking lever 6 to be rotated counterclockwise and thereby releases the second actuating lever 7 from the state of being locked by said lever 6. (When the shutter button returns to its unactuated position, release plate 6 returns to the position shown in FIG. 4.) Once the second actuating lever 7 has been released from the locking lever 6, the mirror actuating lever 12, which is under the biasing effect of the mirror lifting spring 2, is now rotated counterclockwise at a stroke around the common pivot P. As a result, the pin 15 fixed on the upper end thereof urges the mirror lifting lever 16 upwards along the slant edge 36 thereof so as to rotate this lever 16 clockwise until said lever 16 cooperates with the pin 18 to rotate the mirror sheet 17, which has been locked, counterclockwise around the pivot 19 and thereby to effectuate the up swing of the mirror. As previously mentioned, at the end of the mirror's up swing, the raised portion 12a of the mirror actuating lever 12 urges the leading shutter curtain release lever 20 downwards and the latter, in turn, depresses with its lower arm, the shutter locking lever 21 to start operation of the shutter. Thereupon the leading shutter curtain begins to travel, followed by starting of the trailing shutter curtain to accomplish a desired exposure. Before the leading shutter curtain is released to travel, however, the lens stop down lever 11 is lifted to urge the slide plate 13 upwards so that the pin 14 fixed on this plate 13 rotates the integral lever/gear 22 counterclockwise as seen in FIG. 6. The code disc 23 rotated by the intermediate gear as the integral lever/gear 22 is thus rotated intermittently, shuts out the light emitted from the light emitting diode (LED) 24 by the code section 23a thereof, and the light receiving element 25 generates a train of intermittent pulse signals. The number of pulses thus generated represents the diaphragm variation appearing as the diaphragm is progressively stopped down and is applied to a control circuit as the signal input. Upon coincidence of the number of pulses with the control value resulting from photometric calculation, the diaphragm control magnet M is energized and the armature 27, which has been attractively held by the diaphragm control magnet M, is now repelled. Then, the locking lever 26 is rotated counterclockwise around its pivot, bringing the locking tooth 26a into engagement with the gear 42 and preventing its rotation. The slide plate 13 which has been urged by the lens stopping lever 11 upwards is thereby arrested and the operation of stopping down is terminated. Reference is made to Application Ser. No. 235,839, filed Feb. 19, 1981, for a more detailed description of an automatic diaphragm control arrangement that could be employed with the apparatus disclosed herein; the disclosure of this application is incorporated fully herein by reference.

The operation of stopping down is completed before the shutter locking lever 21 is depressed by said leading shutter release lever 20 to start the shutter operation. After opening and closure of the shutter has taken place, the signal generated at the end of the trailing shutter curtain's travel causes the release lever 28 shown in FIG. 5 to be moved downwards against the release driving lever 29. Lever 29 is depressed in opposition to spring 10 by lever 28 to rotate the intermediate lever 30 counterclockwise around its pivot. Then, the elbow end of said lever 30 urges the mirror lowering prevention lever 5 upwards, releasing the first actuating lever 4 from restriction of the locking hook 5a, and thereby allowing said first actuating lever 4 to return to its initial position under the restoring force of the mirror restoring spring 3. The lower end of the mirror actuating lever 12, which is unrestrained by lever 6 at this stage of the sequence, follows the first actuating lever 4 as the latter urges the former during said return. The return movement of the mirror actuating lever 12, occurring clockwise in FIG. 5, causes the mirror to return to the down position as the mirror lifting lever 16 is moved downwards.

According to the present invention, said counterclockwise rotation of the intermediate lever 30, which triggers said downward return of the mirror, simultaneously causes the reset lever 32 shown in FIG. 6 to be rotated counterclockwise around its pivot under the urging action of the pin 31 fixed on the elbow end of said intermediate lever 30. By this time, magnet M is no longer energized. The other end of lever 32, in turn, depresses the pin 33 fixed on the locking lever 26. As a result, the locking tooth 26a which has been in engagement with the gear 42 to lock it against rotation is now disengaged from said gear 42 and the armature 27, which has been freed, is again attractively held against the core of the magnet M.

During said restoration of the respective parts or members, the restoring lever 8 is interlocked with the second actuating lever 7 by the spring 9 so that said restoring lever 8 is brought back to its initial position following the restoration of the second actuating lever 7 and the pin projecting from the top of said restoring lever 8 depresses the slide plate 13 which is, in turn, lowered again together with the lens stop down lever 11 to the initial position.

It will be readily understood from consideration of the manner in which the diaphragm is released and reset in parallel with the sequential restoration of the respective parts or members that, according to the present invention, said sequential restoration of the respective parts or members occurring after operation of the shutter is necessarily accompanied with a particular sequence of operations. Specifically, the locking lever 26 is urged to release the gear 42 from the locking force of the locking tooth 26a acting upon said gear 42 when said locking lever 26 is rotated clockwise under the action of the pin 32 urging the reset lever 31 upwards. This causes the armature 27 to be attractively held again by the core of the magnet M. This feature of the present invention is advantageous in that the correct preparation for the next photographing is necessarily accomplished.

Even when such preparation for the next photographing is impaired by any causes such as an external shock exerted on the camera prior to the operation of shutter charging, which is made immediately before the actual photographing with the result that the armature 27 separated from the core of the magnet M, said operation of charging the shutter necessarily returns the armature 27 to the magnet M. Specifically, prior to shutter charging, lever 4 lies under pin 31 as viewed to FIG. 4, out of engagement with hook 5a. Shutter charging responsive to pin 1 moves lever 4 to the right, as viewed in FIG. 4, over slant edge 5b so its forward end 4a engages hook 5a in the manner depicted in FIG. 4. As member 4 moves over slant edge 5b, it raises lever 5 upwardly thereby raising pin 31 to rotate reset lever 32 in a counterclockwise direction. The rear end of lever 32 in turn rotates the pin 33 fixed on the locking lever 26 and thereby the latter drives the armature 27 against the core of magnet M to be attractively held thereby once again. This avoids malfunctions such as unfaithful or even impossible control of stopping down operation which may occur due to the armature 27 accidentally being separated from the core of said diaphragm control magnet M.

The following is a summary of the sequence of a cycle of operations of the described apparatus:

1. When the shutter and mirror are charged and ready for photographing, levers 4 and 12 are positioned as shown in FIG. 3; lever 12 and the other described components are positioned as shown in FIG. 4.

2. Upon shutter release, as shown in FIG. 1, release plate R moves to the right from the position shown in FIG. 4 to the position shown in FIG. 5, thereby freeing lever 7 and with it lever 12. Spring 2 drives lever 12 counterclockwise so as to raise mirror sheet 17, as shown in FIG. 5. Release plate R returns to its original position by a spring (not shown) after the shutter button is released.

3. While lever 12 is rotating in a counterclockwise direction to raise mirror sheet 17, lever 11 rises to stop down the diaphragm to the desired aperture opening. The code disc 23 is thus rotated by lever/gear to generate the pulse signals.

4. When lever 12 reaches the end of its counterclockwise rotation, diaphragm stop down is completed and lever 12 drives lever 20 against lever 21, thereby initiating the leading shutter curtain.

5. After the trailing shutter curtain closes, a signal is generated to drive lever 28 downwardly against lever 29 thereby simultaneously releasing lever 4 from hook 5a and raising pin 31; when these operations have taken place, levers 4 and 12 are in the position shown in FIG. 2. As a result, levers 12 and 4 are carried by spring 3 until levers 12 and 7 are positioned as shown in FIG. 4, where lever 7 is restrained by lever 6, and lever 4 is positioned as shown in FIG. 4.

6. Finally, pin 1 is depressed responsive to the shutter charging mechanism to catch lever 4 on hook 5a and raise pin 31 again as shown in FIG. 3. This completes the sequence and places the components in the position described in paragraph 1 above.

Pin 31 is raised twice in the sequence. The first time it is raised responsive to counterclockwise rotation of intermediate lever 30, the mirror is reset, i.e., it is returned to its lowered position, locking tooth 26a releases gear 42, and armature 27 is driven against the core of magnet M by lever 26. The second time pin 31 is raised responsive to upward movement of lever 5 as lever 4 recharges the shutter, as shown in FIG. 3.

What is claimed is:

1. In a single lens reflex photographic camera including a shutter release for opening a shutter and a diaphragm, the combination comprising:
    a mirror movable between a first position for view finding and a second position for film exposure;
    means responsive to the shutter release for placing the mirror in the second position;
    a diaphragm stop down gear;
    means responsive to the gear upon shutter release for stopping down the diaphragm;
    a magnetic core and armature;
    means for magnetically repelling the armature from the core during shutter opening;
    means for magnetically attracting the armature to the core prior to and after shutter opening;
    a pivotal locking lever having a locking tooth at one end and the armature at the other end, the locking tooth being so positioned relative to the gear to be rotatable with the locking lever in a first direction into engagement with the gear when the armature is repelled by the core, and in a second direction out of engagement with the gear when the armature is attracted by the core;
    a shutter completion mechanism actuated after exposure;
    means responsive to the actuation of the shutter completion mechanism for rotating the locking lever in the second direction to mechanically drive the armature against the core and placing the mirror in the first position; and
    a shutter charging pin;
    means responsive to the shutter charging pin for rotating the locking lever in the second direction to mechanically drive the armature against the core.

2. The combination of claim 1, in which the means for rotating the locking lever responsive to the shutter charging pin and the means for rotating the locking lever responsive to the actuation of the shutter completion mechanism comprise a pivotal reset lever so positioned relative to the locking lever to rotate the locking lever in the second direction when the reset lever rotates in a first direction and an actuating pin movable in a first direction and a second direction, the actuating pin rotating the reset lever in the first direction as the actuating pin moves in the first direction.

3. In a photographic camera with automatic exposure control, including a shutter release for opening a shutter and a diaphragm, the combination comprising:
    means responsive to the shutter release for stopping down the diaphragm;
    a control magnet having a core and an armature magnetically driven to a first position with respect to the core during shutter opening and magnetically driven to a second position with respect to the core before and after shutter opening;
    means for locking the stop down means when the armature is in the first position;
    means for unlocking the stop down means when the armature is in the second position;
    a shutter completion mechanism actuated after shutter opening;
    means responsive to actuation of the shutter completion mechanism for mechanically driving the armature to the second position;
    a shutter charging pin; and
    means responsive to the shutter charging pin for mechanically driving the armature to the second position.

4. The combination of claim 3, in which the diaphragm stop down means includes a gear and the locking means comprises a pivotal locking lever having a locking tooth at one end and the armature at the other end, the locking tooth being so positioned relative to the gear to be rotatable with the locking lever in a first direction into engagement with the gear when the armature is in the first position.

5. The combination of claim 4, in which the unlocking means comprises means for rotating the locking lever in a second direction opposite to the first direction to disengage the tooth from the gear.

* * * * *